C. F. BEERS.
LOCK WASHER.
APPLICATION FILED JULY 29, 1909.
961,204.
Patented June 14, 1910.
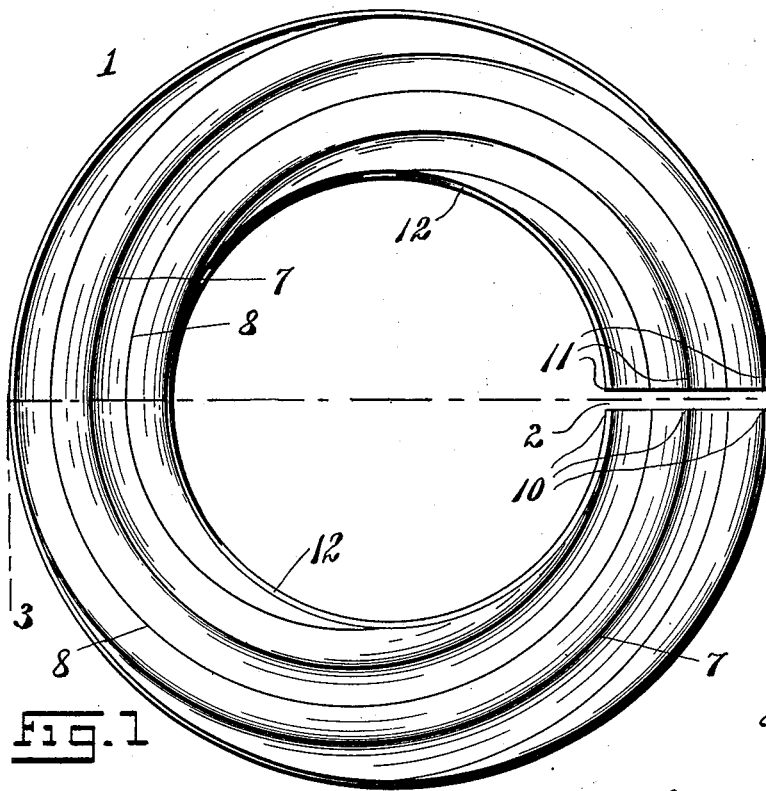
Fig. 1
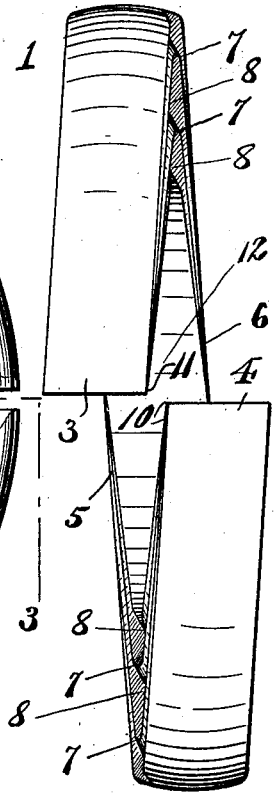
Fig. 2
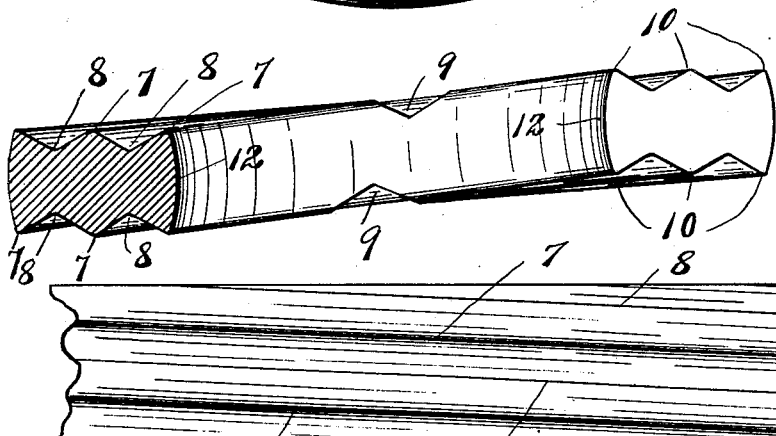
Fig. 3
Fig. 4
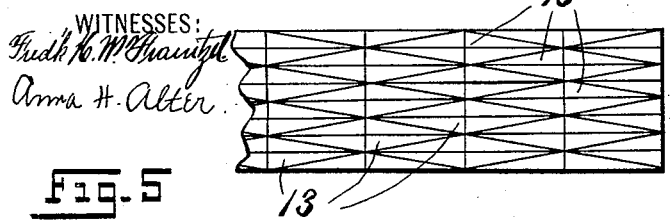
Fig. 5
WITNESSES:
Fredk. K. W. Krautzel
Anna H. Alter
INVENTOR
Charles F. Beers,
BY
Krautzel & Richards,
ATTORNEYS

UNITED STATES PATENT OFFICE.

CHARLES F. BEERS, OF NEWARK, NEW JERSEY.

LOCK-WASHER.

961,204.  Specification of Letters Patent.  Patented June 14, 1910.

Application filed July 29, 1909. Serial No. 510,327.

*To all whom it may concern:*

Be it known that I, CHARLES F. BEERS, a citizen of the United States, residing at Newark, in the county of Essex and State of New Jersey, have invented certain new and useful Improvements in Lock-Washers; and I do hereby declare the following to be a full, clear, and exact description of the invention, such as will enable others skilled in the art to which it appertains to make and use the same, reference being had to the accompanying drawings, and to characters of reference marked thereon, which form a part of this specification.
The present invention relates, generally, to improvements in nut-locks; and, the present invention has reference, more particularly, to a novel lock-washer for use with bolts and nuts of various kinds, and to the kind of lock washer which is split, and is formed with oppositely projecting spring members or retaining elements, the end portions of which provide holding spurs.

The present invention has for its principal object to provide a simply constructed and effectively operating lock-washer of the general character hereinafter set forth, which is split and is formed with oppositely projecting spring-members or elements, the sides or contacting surfaces of said lock-washer being formed with a series of raised portions and depressions, said raised portions and depressions alternating with each other, and each raised portion and depression forming a complete helix, or approximately so; that is, each helix beginning at a point in the inner circular marginal edge-portion of one or both of the side-faces of the spring-members of the washer, and terminating at a point in the outer circular marginal edge-portion of the said side-face or faces of the spring-members, directly opposite or approximately opposite the point of beginning of the helix, which helically formed raised portions when they are brought in contact with the face of that part against which the lock-washer is brought, will at the slit or split-portion of the washer present distinct gripping points, so as to cause the said raised portions to plow into the surface and produce a positive holding or biting relation of the washer with the surface of the nut or other part against which the lock-washer may be arranged.
Consequently a tight and secure frictional engagement of the lock-washer with the parts against which it is arranged is provided, for any tendency upon the part of said washer to turn in the downward direction of the helical curves of the said raised portions and depressions would tend to tighten or screw up the nut, with which said lock-washer was used, upon its bolt, while a tendency of the washer to turn in the opposite direction is overcome on account of what may be termed the upward direction of the helical curves of the said raised portions and depressions.

A further object of this invention is to provide the novel construction of lock-washer upon its interior periphery with a convexed surface, whereby sharp corners or projections are eliminated at the points where said lock-washer must come in contact with the screw-threads of the bolt with which said lock-washer may be used, thus eliminating the danger of crushing, cutting or otherwise injuring the screw-threads of said bolts, as so frequently occurs when using the ordinary lock-washer provided with the straight interior periphery with its sharp corners or projecting edges.

Other objects of this invention not at this time more particularly mentioned will be clearly evident from the following detailed description of the same.

My invention consists, therefore, in the novel lock-washer hereinafter more particularly described, and then finally embodied in the clauses of the claims which are appended to and which form an essential part of this specification.

The invention is clearly illustrated in the accompanying drawings, in which:—

Figure 1 is a face view of the novel construction of lock-washer embodying the principles of the present invention. Fig. 2 is an edge elevation of the same. Fig. 3 is a transverse section of the said lock-washer, said section being taken on line 3—3 in said Fig. 1. Fig. 4 is a side view of a portion of the metallic stock out of which the said novel construction of lock-washers are formed, this view illustrating more particularly the method of preparing said metallic stock with the series of raised portions and depressions, which, when said metallic stock is rolled or coiled upon a mandrel to form said lock-washers, assume the form of eccentric or helical raised portions and depressions upon the side or contacting surfaces of said lock-washers. Fig. 5 is a similar view but showing a different method of preparing said metallic stock with a plurality of raised portions and depressions preferably pyramidical in form.

Similar characters of reference are employed in the above described views, to indicate corresponding parts.

Referring now to the several figures of the drawings, the reference-character 1 indicates the complete novel form of lock-washer embodying the principles of my present invention, the same being preferably made of spring-steel and being properly tempered. The lock-washer is cut across one of its portions, as at 2, the end-members formed extending laterally in opposite directions, so as to provide a spirally formed or twisted ring-like body having the free end-portions 3 and 4 whereby a spiral washer is provided. The side faces or contacting surfaces 5 and 6 of the lock-washer are provided with a series of eccentrically disposed and helically formed raised portions 7 and corresponding and intermediately disposed depressions 8. The arrangement of these raised portions 7 and corresponding intermediately disposed depressions 8, is such that each raised portion and each depression forms a complete helix starting at the inner edge periphery, as at 9, of said washer and terminating at the outer edge periphery, or approximately so, as clearly shown in Fig. 1 of the drawings. The said raised portions or ridges thus formed will embed themselves in the face of the nut and the face of the body against which the washer is placed, when the nut is tightly screwed home upon its bolt and against the said lock-washer; and, when said raised portions 7 are thus embedded in the nut and the other body with which they are brought in contact, a more perfect anti-slipping or anti-turning relation of the parts will be produced than is secured with the ordinary washer. The tendency of either the nut or lock-washer to turn is entirely overcome on account of what may be termed the upward or outflowing direction of the said helical curves of the raised portions 7 which are eccentric to the line of direction or revolution of either the said lock-washer or nut. The points or spurs 10 and 11 which are formed by the termination of said raised portions 7 at the free end-portions 3 and 4 of said lock-washer also tend to bite into the nut and other body with which said washer is brought in contact, thus affording still further means and safe-guards for preventing the turning of either nut or washer. The inner peripheral edge of said lock-washer is provided with a convexed formation 12 thus eliminating sharp corners and edges which tend to catch in the screw-threads of the bolt upon which the washer may be used, whereby the same are crushed, broken or otherwise injured. The convexed formation 12 can only come in contact with the screw-threads of a bolt at a point midway between the side surfaces of said washer so that the peripheral edges of the side surfaces of said washer cannot engage with or come in contact injuriously with the screw-threads of a bolt upon which the said washer may be placed or arranged.

Referring more particularly to Fig. 5 of the drawings there is illustrated therein a construction of surface with which the faces of said lock-washers may be provided. This construction comprises a plurality of raised portions of pyramidical formations 13 systematically arranged so as to provide alternating high and low points which are disposed on lines forming complete helices, in the manner herein-above stated, when the washer is formed; and, whereby a strong frictional engagement of the side surfaces of said lock-washer may be obtained when the same is arranged against a nut and other body.

From the foregoing description of my invention it will be clearly seen, that I have provided a simply constructed and efficiently operating lock-washer which is admirably adapted for use on railway rails, automobiles, presses and various kinds of machinery and vehicles which are subject to vibration. The lock-washer can also be made in various sizes so as to be adapted for use with bolts and nuts of various kinds and sizes.

I claim:—

1. As a new article of manufacture, a split-washer comprising a ring-shaped body, said body being provided upon one of its side faces with raised portions and intermediate depressions, each raised portion and depression forming a complete helix having its end-point opposite its starting point.

2. As a new article of manufacture, a split-washer comprising a spirally formed ring-shaped body, said body being provided upon one of its side faces with raised portions and intermediate depressions, each raised portion and depression forming a complete helix having its end-point opposite its starting point.

3. As a new article of manufacture, a split-washer comprising a ring-shaped body, said body being provided at its inner peripheral edge with a convex formation extending from one to the other of its side faces, said body being further provided upon one of its side faces with raised portions and intermediate depressions, each raised portion and depression forming a complete helix having its end-point opposite its starting point.

4. As a new article of manufacture, a split-washer comprising a spirally formed ring-shaped body provided with free-end portions, said body being provided at its inner peripheral edge with a convex formation extending from one to the other of its side faces, said body being further provided upon one of its side faces with raised portions and intermediate depressions, each raised portion and depression forming a complete helix having its end-point opposite its starting point.

5. As a new article of manufacture, a split-washer comprising a spirally formed ring-shaped body provided with free end portions, said body being provided at its inner peripheral edge with a convex formation extending from one to the other of its side faces, said body being further provided upon one of its side faces with raised portions and intermediate depressions, each raised portion and depression forming a complete helix having its end point opposite its starting point, said raised portions and depressions forming spurs at the split portion of the washer.

6. As a new article of manufacture, a split-washer comprising a spirally formed ring-shaped body provided with free end-portions, said body being further provided upon one of its side faces with raised portions and intermediate depressions, each raised portion and depression forming a complete helix having its end point opposite its starting point, said raised portions and depressions forming spurs at the split portion of the washer.

In testimony, that I claim the invention set forth above I have hereunto set my hand this 28th day of July, 1909.

CHARLES F. BEERS.

Witnesses:
 FRED'K H. W. FRAENTZEL,
 GEORGE D. RICHARDS.